Sept. 20, 1966  C. E. CLEETON  3,274,598
DIRECTIVE RESPONSE TRANSPONDER SYSTEM
Filed Feb. 26, 1964  2 Sheets-Sheet 1
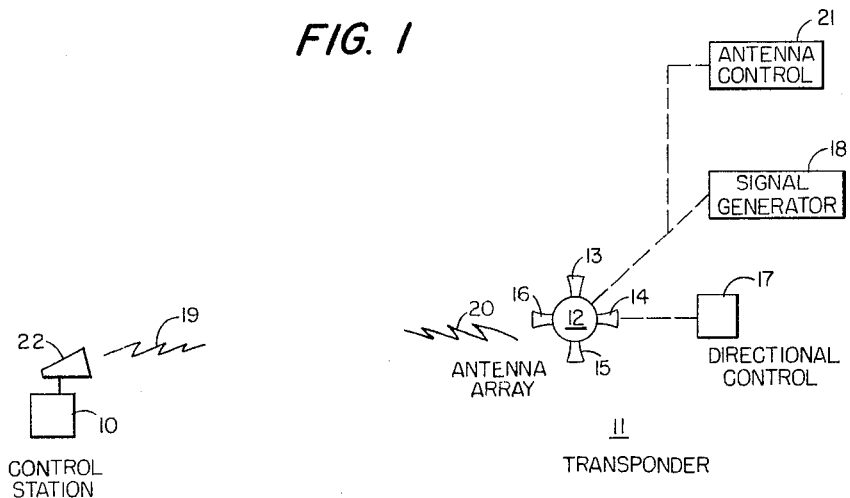
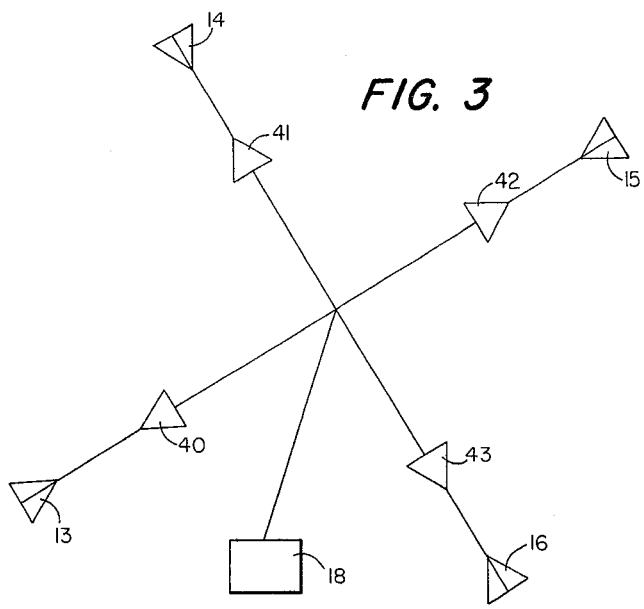
INVENTOR
*CLAUD E. CLEETON*
BY  *James D. Murray* AGENT
*Richard S. Reed* ATTORNEY

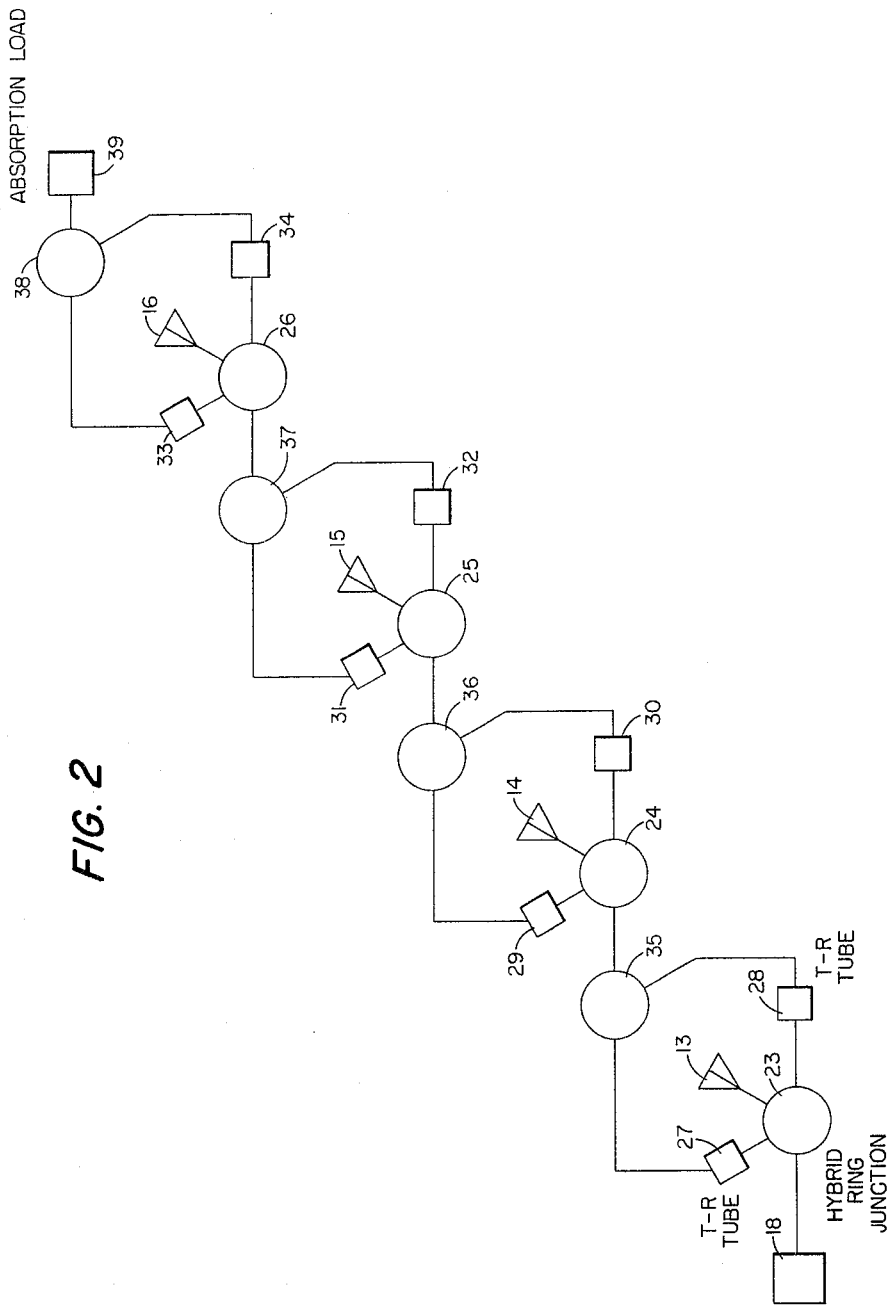

3,274,598
DIRECTIVE RESPONSE TRANSPONDER SYSTEM
Claud E. Cleeton, 2424 34th St. SE.,
Washington, D.C. 20020
Filed Feb. 26, 1964, Ser. No. 347,625
8 Claims. (Cl. 343—100)

The invention described herein may be manufactured and used by or for the Government of the United States of America for governmental purposes without the payment of any royalties thereon or therefor.

The present invention relates to a method of communication and apparatus for practicing the method and more particularly to a method and system for communication wherein the response signal from a controlled transmitter is directed toward the location of the controlling station.

Because of their obvious importance, electronic transponder systems have been the object of intensive development effort. For example, in the field of aircraft identification, the transponder systems commonly known as IFF (identification friend or foe) have been so useful that they are considered to be almost indispensible. Transponder systems have also been highly useful in controlling and utilizing satellites.

While previous systems have in general proven to be satisfactory, they have lacked the capability of replying only in the direction of the interrogating station. Because of the omni-directional nature of the reply transmitted by the transponder in previous systems, stations other than the interrogating station receive the transponder reply signal. This is particularly undesirable in wartime, since the enemy is able to monitor and to prematurely crack the code being used in the transponder system and thereafter to equip his aircraft to deceive the interrogator and appear to be a friend. Further, because of the high power demands of the inefficient omni-directional transponder antenna, the size of the transponder equipment is undesirably large.

It is, therefore, an object of the present system to provide a method of communication wherein the reply of a controlled transmitter is directed toward a control station.

Another object of the invention is to provide a communication system wherein the reply of a controlled transmitter is directed toward a control station.

Still another object of the invention is the provision of a method wherein the interrogating signal includes characteristics which control the direction of reply by the transponder.

A further object of the invention is the provision of a transponder system wherein the interrogating signal contains characteristics which control the transponder to reply only in the direction of the interrogating station.

Other objects and many of the attendant advantages of this invention will be readily appreciated as the same becomes better understood by reference to the following detailed description of several embodiments of the invention when considered in connection with the accompanying drawings in which like reference numerals designate like parts throughout the figures thereof and wherein:

FIG. 1 illustrates the invention in block diagram form and

FIGS. 2 and 3 illustrate alternate antenna arrangements usable with the invention.

In brief, the invention contemplates a communication system which includes a control station and a controlled transponder having an array of directional antennas that is maintained in a fixed direction. The characteristics of the interrogating signal from the control station are such that the transponder is energized to transmit a signal directed toward the control station.

Referring now to FIG. 1, the control station 10 could, depending upon the operational circumstances, be located aboard a moving vehicle, such as a ship, submarine or aircraft, or could be fixed in position at a land installation, such as a satellite observation station. Similarly, the transponder 11 could, depending upon the nature of the operational system, be contained on a moving vehicle, typically an airplane or a satellite. The transponder includes an array 12 of angularly spaced directional antennas 13, 14, 15 and 16, illustrated as four in number, although more could obviously be used. Directional control means 17, which could be of any conventional form, such as gyroscopic or homing radio devices, maintains the array 12 in a predetermined spatial orientation.

As is conventional with such units, the transponder 11 includes an electronic signal generating system 18, which responds to a signal 19 received from the control station by generating a signal 20 which is transmitted back to the control station. The signal 20 could, in an IFF system, be a response in predetermined code to the interrogation signal 19, or in the case of a satellite, the signal 20 could be representative of data sensed and stored by the satellite when beyond radio range from the control station.

The transponder 11 further includes an antenna control 21 which, in response to certain characteristics of the signal 19, controls the antenna array 12 to transmit the signal 20, produced by generator 18, from only one of the directional antennas 13, 14, 15 or 16. Alternate arrangements for the control of antenna array 12 are described hereinafter in connection with FIGS. 2 and 3. The characteristics of signal 19, to which antenna control 21 responds, are determined by the operator of control station 10 and may be of any well known form, such as the interval between two pulses, the duration of a pulse, the frequency or number of pulses in a pulse train, etc. The exact nature of these characteristics of signal 19, as well as the exact form of control 21, is not a part of this invention since the operational details of many different control techniques are well known to those skilled in the art of remote control.

The operation of the transponder system of FIG. 1 will now be explained. The operator at control station 10 knows, from search radar or other tracking information, the location of the vehicle containing transponder 11. Assuming that the vehicle contains a transponder susceptible to interrogation, the operator determines, by simple graphical methods, the orientation of the antenna array 12 relative to control station 10. Since the antenna array 12 is maintained in a predetermined spatial orientation by directional control 17, it is then obvious to the operator which one of directional antennas 13, 14, 15 or 16 is best suited to transmit the reply signal 20 and which characteristics should be incorporated into the interrogating signal 19. The appropriate signal 19 is then transmitted by control station 10 by means of antenna 22, which for maximum security could be highly directional. If the transponder system is for the purpose of aircraft identification, the signal 19 energizes the generator 18 to produce the appropriately coded IFF signal 20 and also energizes the antenna control 21 to cause the antenna 13, 14, 15 or 16, as determined by the operator, to transmit the signal 20. In an analogous manner, if the transponder system is for the purpose of interrogating a satellite, the signal 20 is representative of data previously accumulated and stored by systems aboard the satellite and is transmitted over the antenna 13, 14, 15 or 16 as determined by the operator.

The transponder system according to the invention has many advantages over previous transponder systems. Because the signals 20, and preferably the signals 19, are transmitted by directional antenna, the risk that these signals will be received by unintended stations is greatly reduced. If the invention is used as an IFF system, the possibility of an enemy monitoring both the interrogating and reply signals and thereby prematurely cracking the IFF code, is virtually eliminated. Similarly, when the invention is used to interrogate satellites, there is little likelihood that the information obtained by the satellite will become known to undesired persons.

Another advantage of a transponder system according to the invention is that, because the reply is transmitted by an efficient directional antenna, rather than by an inefficient omni-directional antenna, less power is required to obtain a given range. A smaller power demand can be translated into a decrease in weight and in size of the entire transponder system. Savings in weight and space, while highly desirable in aircraft, are of immense importance in equipment carried on a satellite.

Alternate arrangements of the antenna control that may be used with the transponder system of FIG. 1 will now be described, although it is emphasized that the antenna arrangement must be related to the transmission frequency of the transponder 11 and that any system is suitable which can be remotely controlled to connect and disconnect the antennas 13, 14, 15 and 16 to the generator 18 or which may be arranged to direct the reply transmission in a controlled direction.

In FIG. 2 the antennas 13–16 are illustrated as being connected to hybrid ring junctions 23–26 of the form commonly called "rat-races." T–R tubes 27–34 are selectively fired, by any suitable means according to the characteristics of the signal 19, to cause the signal 20 to be transmitted by the desired antenna. The junctions 23–26 are joined with junctions 35–38 to form a series originating in generator 18 and terminating in absorption load 39. Although it is believed that the operation of the antenna control arrangement illustrated in FIG. 2 will be obvious to skilled persons, a more detailed discussion of the functioning of "rat-race" junctions can be found in page 551 of the Proceedings of the IRE, vol. 34, No. 8 for August 1946 in an article entitled "Radar" by Edwin G. Schneider.

In FIG. 3 the generator 18 is illustrated as being connected to the antennas 13, 14, 15 and 16 by amplifiers 40, 41, 42 and 43, only one of which is energized to pass and amplify the energy from generator 18. Which one of the amplifiers 40, 41, 42 and 43 is conductive is controlled by any suitable means in response to the characteristics of the signal 19.

In summary, the above described invention provides a method and means of communication wherein the reply of a controlled transmitter is directed toward a control station or in some other desired direction. Obviously many modifications and variations of the invention are possible in the light of the above teachings. It is therefore to be understood, that within the scope of the appended claims, the invention may be practiced otherwise than as specifically described.

What is claimed is:

1. A transponder system comprising:
   control station means including a receiver and a transmitter for transmitting a first electrical signal having certain characteristics;
   a transponder unit located on a vehicle;
   an array of directional antennas and directional control means included in said transponder unit, said directional control means being operatively coupled to said array to maintain said array in a predetermined spatial orientation;
   signal generator means included in said transponder unit and responsive to some of said certain characteristics of said first signal to generate a second signal and
   antenna control means included in said transponder unit and responsive to other of said certain characteristics of said first signal to cause said second signal to be transmitted by only a selected one antenna of said array.

2. A transponder system as set forth in claim 1 wherein said antenna control means includes hybrid ring junctions connected to the antennas in said array and controlled by T–R tubes.

3. A transponder system as set forth in claim 1 wherein said antenna control means includes amplifiers connected to said antennas in said array.

4. A transponder system as set forth in claim 1 wherein said second signal is related by a predetermined code to said some of said certain characteristics.

5. A transponder system as set forth in claim 4 wherein said antenna control means includes hybrid ring junctions connected to the antennas in said array and controlled by T–R tubes.

6. A transponder system as set forth in claim 4 wherein said antenna control means includes amplifiers connected to said antennas in said array.

7. A communications system comprising:
   a control station for transmitting a first electrical signal having certain characteristics;
   mobile receiver means for receiving said first signal; and
   transmission means mobile with said receiver means and responsive to said received first signal to generate and transmit a second electrical signal in a direction determined by at least some of the characteristics of said first signal;
   said transmission means including an array of directional antennas and directional control means connected to said array of antennas for maintaining said array in a predetermined spatial orientation.

8. The communications system set forth in claim 7 wherein said direction is toward said control station and said control station includes a receiver to receive said second signal.

References Cited by the Examiner

UNITED STATES PATENTS

| | | |
|---|---|---|
| 2,152,329 | 3/1939 | Schussler. |
| 2,401,759 | 6/1946 | Hersey. |

CHESTER L. JUSTUS, *Primary Examiner.*

R. E. BERGER, *Assistant Examiner.*